United States Patent
Bouazizi

(10) Patent No.: US 8,510,375 B2
(45) Date of Patent: Aug. 13, 2013

(54) APPARATUS AND METHODS FOR TIME MAPPING MEDIA SEGMENTS IN STREAMING MEDIA FILES

(75) Inventor: Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 218 days.

(21) Appl. No.: 12/965,766

(22) Filed: Dec. 10, 2010

(65) Prior Publication Data

US 2011/0307545 A1  Dec. 15, 2011

Related U.S. Application Data

(60) Provisional application No. 61/285,904, filed on Dec. 11, 2009.

(51) Int. Cl.
*G06F 15/16* (2006.01)
(52) U.S. Cl.
USPC .......................... 709/203; 709/231; 709/232
(58) Field of Classification Search
USPC ................................ 709/202–203, 231–232
See application file for complete search history.

(56) References Cited

U.S. PATENT DOCUMENTS

| | | | |
|---|---|---|---|
| 7,302,490 B1 | 11/2007 | Gupta et al. | |
| 7,373,413 B1 | 5/2008 | Nguyen et al. | |
| 8,090,761 B2 * | 1/2012 | Apostolopoulos et al. | ... 709/232 |
| 8,200,747 B2 * | 6/2012 | Apostolopoulos et al. | ... 709/203 |
| 2008/0022320 A1 | 1/2008 | Ver Steeg | |
| 2008/0034276 A1 | 2/2008 | Ficco | |
| 2008/0104267 A1 | 5/2008 | Dawson | |
| 2008/0256254 A1 | 10/2008 | Kim et al. | |
| 2008/0267213 A1 | 10/2008 | Deshpande | |
| 2008/0310814 A1 | 12/2008 | Bowra et al. | |
| 2009/0110368 A1 | 4/2009 | Nelson et al. | |
| 2010/0023964 A1 * | 1/2010 | Basso et al. | ..................... 725/32 |
| 2011/0119394 A1 * | 5/2011 | Wang et al. | .................... 709/231 |
| 2012/0185530 A1 * | 7/2012 | Reza | ............................. 709/203 |
| 2012/0191548 A1 * | 7/2012 | Des Jardins et al. | ....... 705/14.68 |

FOREIGN PATENT DOCUMENTS

| | | | |
|---|---|---|---|
| EP | 0949821 A2 | 10/1999 | |
| EP | 1932315 A1 | 6/2008 | |
| EP | 1974526 A1 | 10/2008 | |
| EP | 2055107 A2 | 5/2009 | |

(Continued)

OTHER PUBLICATIONS

"Digital Rapids Enables Smoother Streaming and Advanced Workflows with Stream 3.1 Encoding Upgrade", Digital Rapids, Sep. 10, 2009, 2 pages.

(Continued)

*Primary Examiner* — Bharat N Barot
(74) *Attorney, Agent, or Firm* — Alston & Bird LLP

(57) ABSTRACT

Apparatus, methods, and computer program products are provided for receiving and presenting, or playing-out, representations of media content and for enabling time synchronization and random seeking across multiple representations. A client device can access an appropriate time mapping fragment that associates play-out time intervals of the media content of the multiple representations with the corresponding media segments to identify the appropriate media segment corresponding to the desired time point within the current representation or in another selected representation. The time mapping fragments may be created and preloaded onto a media content server, and the media content server may transmit the time mapping fragment(s) to a client device upon receiving a request form the client device or as part of a media segment. In other cases, the media content server may create the time mapping fragments dynamically, e.g., upon receiving a request from the client device.

20 Claims, 9 Drawing Sheets

(56) References Cited

FOREIGN PATENT DOCUMENTS

| WO | 2007/026237 | A1 | 3/2007 |
| WO | 2007/080500 | A1 | 7/2007 |
| WO | 2008/023328 | A2 | 2/2008 |
| WO | 2009/018047 | A1 | 2/2009 |
| WO | 2009/024926 | A1 | 2/2009 |
| WO | 2009/033345 | A1 | 3/2009 |

OTHER PUBLICATIONS

International Search Report and Written Opinion, in corresponding Patent Cooperation Treaty Application No. PCT/IB2010/055761. Dated Apr. 5, 2011. 12 pages.

3GPP Draft; "Fragmented Time Indexing of Representations", S4-AHI126, 3GPP Dec. 11, 2009. 3GPP-TSG SA4 Ad-Hoc Meeting. Dec. 14-16, 2009, Paris France. Whole Document.

\* cited by examiner

```
<xs:element name="Representation">
   <xs:complexType>
      <xs:sequence>
         <xs:element name="Track" type="TrackType" minOccurs="1" maxOccurs="unbounded"/>
      <xs:sequence>
      <xs:attribute name="Bandwidth" type="xs:unsignedLong" use="required"/>
      <xs:attribute name="id" type="xs:string" use="required"/>
   </xs:complexType>
</xs:element>

<xs:complexType name="TrackType">
   <xs:attribute name="id" type="xs:unsignedInt" use="required"/>
   <xs:attribute name="type" type="MediaType" use="required"/>
   <xs:attribute name="lang" type="xs:lang" use="optional"/>
   <xs:attribute name="mime" type="xs:string" use="required"/>
</xs:complexType>

<xs:simpleType name="MediaType">
   <xs:restriction base="xs:string">
      <xs:enumeration value="video"/>
      <xs:enumeration value="audio"/>
      <xs:enumeration value="3gpp-text"/>
   </xs:restriction>
</xs:simpleType>
```

FIG. 4

```
<xs:element>
   <xs:attribute name="urlPattern" value="xs:string"/>
   <xs:attribute name="Interval" value="xs:unsignedLong"/>
</xs:element>
```

FIG. 6

```
<?xml version="1.0" encoding="utf-8"?>
<xs:schema targetNamespace="http://tempuri.org/XMLSchema.xsd"
    elementFormDefault="qualified"
    xmlns="http://tempuri.org/XMLSchema.xsd"
    xmlns:mstns="http://tempuri.org/XMLSchema.xsd"
    xmlns:xs="http://www.w3.org/2001/XMLSchema"
>
<xs:complexType name="TimeMappingFragmentType">
  <xs:sequence>
    <xs:element name="RepresentationSegmentList" type="SegmentListType" minOccurs="1" maxOccurs="unbounded"/>
  </xs:sequence>
  <xs:attribute name="IntervalStartTime" type="xs:dateTime" use="required"/>
</xs:complexType>

<xs:complexType name="SegmentListType">
  <xs:sequence>
    <xs:element name="SegmentInformation" type="SegmentInformationType" minOccurs="1" maxOccurs="unbounded"/>
  </xs:sequence>
  <xs:attribute name="RepresentationId" type="xs:string" use="optional"/>
  <xs:attribute name="TrackID" type="xs:unsignedInt" use="optional"/>
</xs:complexType>

<xs:complexType name="SegmentInformationType">
  <xs:attribute name="SegmentId" type="xs:unsignedInt" use="required"/>
  <xs:attribute name="StartTime" type="xs:dateTime" use="required"/>
  <xs:attribute name="EndTime" type="xs:dateTime" use="optional"/>
  <xs:attribute name="Offset" type="xs:unsignedLong" use="optional"/>
</xs:complexType>
</xs:schema>
```

FIG. 10

APPARATUS AND METHODS FOR TIME MAPPING MEDIA SEGMENTS IN STREAMING MEDIA FILES

TECHNOLOGICAL FIELD

Embodiments of the present invention relate generally to communications technology and, more particularly, relate to systems, methods and apparatus for media file streaming.

BACKGROUND

As advances are made in communications technology, streaming media is becoming more and more practical and affordable for ordinary consumers. At the same time, greater network bandwidth, increased access to networks, the use of standard protocols and formats, and the commercialization of the Internet have resulted in a greater demand for multimedia content. The expansion of networks and evolution of networked computing devices has provided sufficient processing power, storage space, and network bandwidth to enable the transfer and playback of increasingly complex digital media files. Accordingly, Internet television and video sharing are gaining widespread popularity.

BRIEF SUMMARY

Apparatus, methods, and computer program products are therefore provided according to embodiments of the present invention for receiving and presenting, or playing-out, representations of media content and for enabling time synchronization and random seeking across multiple representations. In particular, a fragmented table may be defined that maps play-out or presentation time intervals of the content associated with the multiple representations with the corresponding media segments. When seeking or switching between representations, the client device can thus access the appropriate time mapping fragment to identify the appropriate media segment corresponding to the desired time point within the current representation or in another selected representation.

In one exemplary embodiment, a method and computer program product for receiving and presenting, or playing-out, representations of media content and for enabling time synchronization and random seeking across multiple representations are provided. According to the method and the computer program product, a client device presents a first media segment of a first representation of a selected media content file. The client device determines a desired time point or a desired second representation to be presented. A second media segment is identified and retrieved, wherein the second media segment contains one or more media samples with presentation time equal to the desired presentation time point in the first representation or in the desired second representation or equal to the current time point in the desired representation.

In another exemplary embodiment, a method and computer program product for declaring and signaling representations of media content and for enabling time synchronization and random seeking across multiple representations are provided. According to the method and the computer program product, an apparatus, such as a media content server, transmits a Multimedia Presentation Description to a client device in response to a request for media content. A first media segment of a first representation is transmitted to the client device, and time mapping information relating to at least one media segment is created. The time mapping information is transmitted by the apparatus to the client device. The time mapping information may be transmitted to the client device with the corresponding media segments or in response to at least one request made by the client device. The Multimedia Presentation Description may include a Uniform Resource Locator (URL) pattern that is used by the client device to retrieve or request the time mapping information.

In another exemplary embodiment, an apparatus is provided that includes a processor and a memory storing computer code instructions that when executed by the processor cause the apparatus to present a first segment of a first representation of a selected media content file. The memory and the computer code instructions, with the processor, further cause the apparatus to determine a desired time point or a desired second representation to be presented. The apparatus is caused to identify a second media segment, wherein the second media segment contains one or more media samples with presentation time equal to the desired presentation time point in the first representation or in the desired second representation or equal to the current time point in the desired representation. The memory and the computer code instructions, with the processor, further cause the apparatus to retrieve the second media segment.

In another exemplary embodiment, an apparatus is provided that includes a processor and a memory storing computer code instructions that when executed by the processor cause the apparatus to transmit a Multimedia Presentation Description to a client device in response to a request for media content. The memory and the computer code instructions, with the processor, further causes the apparatus to transmit a first media segment of a first representation to the client device and to create time mapping information relating to the at least one media segment. The apparatus is further caused to transmit the time mapping information to the client device. The time mapping information may be transmitted as time mapping fragments to the client device with the corresponding media segments or in response to at least one request made by the client device. The Multimedia Presentation Description may include a Uniform Resource Locator (URL) pattern that is used by the client device to retrieve or request the time mapping information.

In another exemplary embodiment, a system is provided that includes a client device configured to present at least one media segment and a media content server configured to communicate time mapping information to the client device over a network. The client device may present a first media segment of a first representation of a selected media content file. The client device may then determine a desired time point or a desired second representation to be presented. The media content server may transmit time mapping information to the client device with the corresponding media segments or in response to at least one request made by the client device. The client device may then identify a second media segment based on the time mapping information and may request the second media segment from the media content server. The client device may request the time mapping information or the second media segment using a Uniform Resource Locator (URL) pattern that is transmitted by the media content server to the client device.

The fragmentation of the time mapping information into time mapping fragments according to embodiments of the invention may have several benefits. It can allow for quicker start-up of the presentation of the media segments, as no large indexing files need to be pre-downloaded before play-out can start. In addition, the client device may be able to access a portion of the data that is needed without having to download and store large pieces of the data.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 4 depicts a representation of a description element according to an exemplary embodiment of the invention;

FIG. 6 depicts a representation of an element that addresses the time mapping fragments according to an exemplary embodiment of the invention;

FIG. 10 depicts a representation of an XML schema of a time mapping fragment.

DETAILED DESCRIPTION

Figure 1:
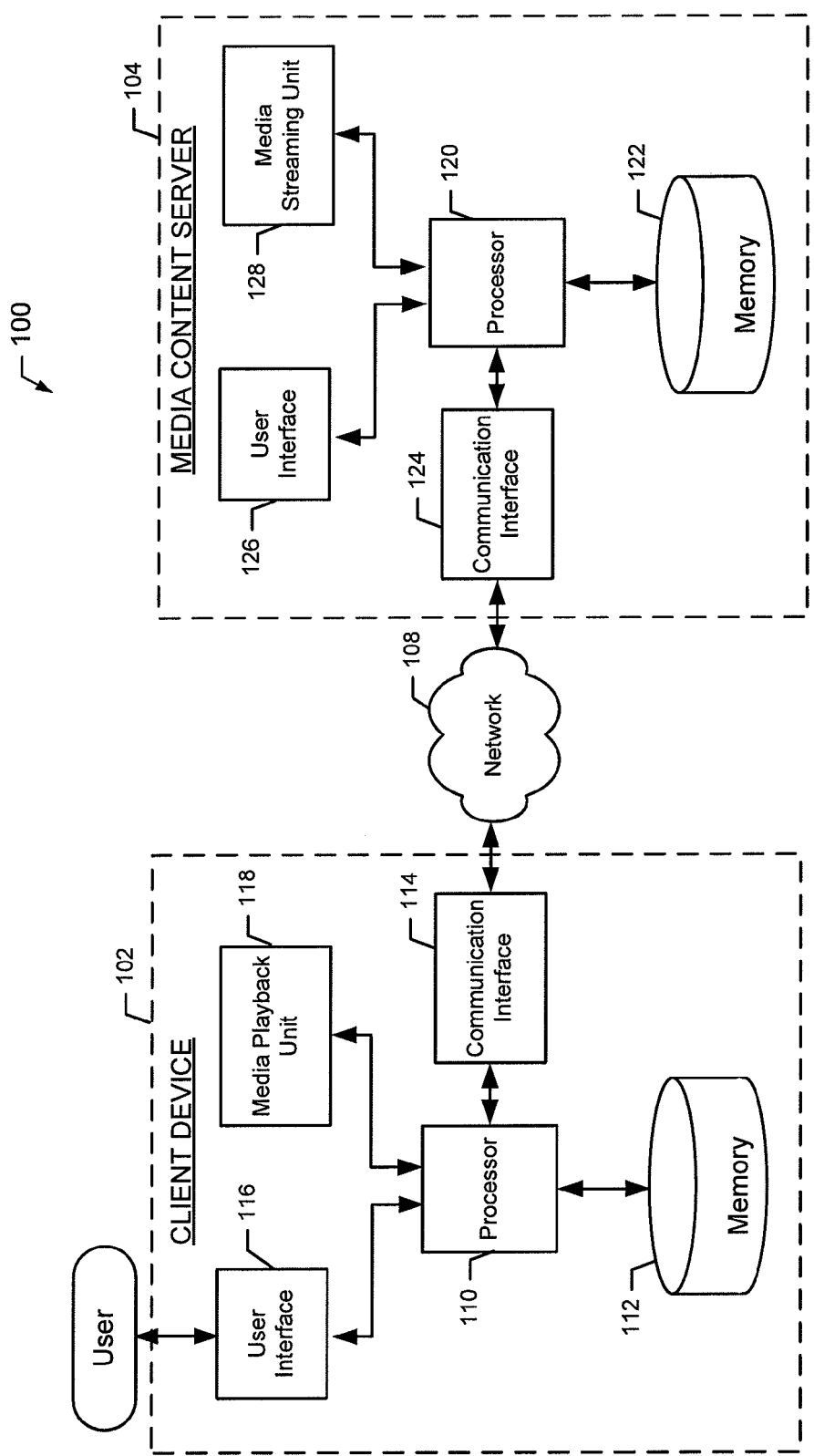
FIG. 1 illustrates a system for facilitating streaming of media files using a transfer protocol according to an exemplary embodiment of the present invention.

Some embodiments of the present invention will now be described more fully hereinafter with reference to the accompanying drawings, in which some, but not all embodiments of the invention are shown. Indeed, it should be appreciated that many other potential embodiments of the invention, in addition to those illustrated and described herein, may be embodied in many different forms. Embodiments of the present invention should not be construed as limited to the embodiments set forth herein; rather, the embodiments set forth herein are provided so that this disclosure will satisfy applicable legal requirements. Like reference numerals refer to like elements throughout.

As used herein, "exemplary" merely means an example and as such represents one example embodiment for the invention and should not be construed to narrow the scope or spirit of embodiments of the invention in any way. Further, it should be appreciated that the hypertext transfer protocol (HTTP) is used as an example of an application layer transfer protocol. Example embodiments of the invention comprise streaming of media files using other application layer transfer protocols.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Media content can generally be streamed from a server to a client through streaming or through HTTP streaming. In streaming, the content is typically transmitted directly to the computer or other client device without saving the media file to a hard disk or other memory of the client device. In HTTP streaming, the content file is typically progressively downloaded and saved to a hard disk or other memory of the client device, and the content is then played from that location. Thus, the client may begin playback of the media before the download is complete.

Real Time Streaming Protocol (RTSP) is a network control protocol for use in entertainment and communications systems to control streaming media servers in real-time applications. RTSP is used to establish and control media sessions between end points. For example, clients of media servers can issue VCR-like commands, such as "play" and "pause," to facilitate real-time control of playback of media files from the server. Many RTSP servers use the Real-time Transport Protocol (RTP) for media stream delivery.

HTTP streaming, however, is replacing regular RTSP/RTP-based streaming in several applications that require multimedia delivery. Even though HTTP was not designed for the delivery of real-time media, HTTP provides significant benefits that make it attractive for real-time applications. Among other advantages, HTTP is very easy to set up and deploy, is granted pass-through traversal of firewalls and other network nodes, and is widely deployed with a very robust infrastructure (such as HTTP caches) that enables efficient data distribution.

HTTP is typically used with Transfer Control Protocol (TCP), a transport layer protocol that generally provides reliable, ordered delivery of a stream of bytes between communication nodes. Among its other management tasks, TCP controls media segment size, flow control, data exchange rate, and network traffic congestion to deliver a stream of bytes with guaranteed in-order delivery and without any losses from one node to another. TCP combats errors by using retransmission, i.e., retransmitting a lost TCP datagram (a packet of data passed across a network) multiple times until it is correctly delivered or the whole connection is aborted. Correct order delivery is verified by using sequence numbers for the TCP datagrams. TCP thus operates in a connection-oriented mode and relies on acknowledgments to discover datagram losses. In addition, TCP makes use of a congestion control and flow control algorithm that allows the sender to adapt its transmission rate automatically to the available bandwidth and to the receiver's capacity.

HTTP is an application layer protocol that was originally developed for the delivery of hyperlinked text documents; however, use of HTTP has evolved with time to cover the delivery of other types of files. HTTP uses a request/response model to retrieve remote resources from a web server. According to this model, the client device establishes a TCP connection to the server, typically on port 80, and exchanges HTTP messages with the server. An HTTP message typically includes a header portion and an optional body portion. The header portion is a sequence of HTTP header fields, each ending with a carriage return/line feed character. The HTTP message header is separated from the HTTP message body by an empty line. The HTTP header fields are provided in a human-readable textual format. A Uniform Resource Locator (URL) is used to identify and locate the resource that is to be retrieved by the HTTP client. A URL consists of a protocol identifier, a fully-qualified domain name, a path to the requested resource, and (optionally) a query string.

When HTTP is used for the delivery of real-time media, such as audio/video content, the content is retrieved through progressive streaming, e.g., the content is delivered in progressive download mode. Using this approach, the client device retrieves the media file through a regular file download. The client device then starts the playback of the received file after a short start-up delay. The HTTP progressive streaming may be transparent to the HTTP server and controlled by the client device.

A device that is capable of progressive download playback relies on metadata located in the header of the file and a local buffer of the digital media file as it is downloaded from a web server to determine how to play the content. The point at which a specified amount of data becomes available to the client device, the media will begin to play. This specified amount of buffer is embedded into the file by the producer of the content in the encoder settings and is reinforced by additional buffer settings imposed by the media player.

Thus, a media preparation step may be necessary to enable progressive download. Generally, the media file needs to be converted into a format that enables the client to start playback as soon as possible. The ISO-base media File Format (ISOFF) is suitable for progressive download, which allows the content provider to put the metadata information at the beginning of the file. This allows the receiver to first retrieve all metadata and then start receiving the media data. The received media data may then be played back immediately using the previously received metadata; however, this generally results in very long initial playback time that is attributable to a very large amount of metadata information.

Adaptive HTTP streaming enables the client to adapt the streamed content based on the user's preferences and bandwidth availability. In adaptive HTTP streaming, the content is encoded in multiple representations, and the client is able to switch between the different representations at the boundaries of media segments. An issue that arises, however, is that the media segments in one representation are typically not time-aligned with the media segments in another representation. Thus, when switching from one representation to another, the client device may not be able to determine where to locate the media segment of the new representation that has media content corresponding to the same time point as the previous representation. In addition, seeking a specific portion of the content within the same representation may be significantly complicated by the lack of time mapping information for the media segments, and the client device may be required to perform a search to locate the particular media segment that contains the desired media content.

According to an exemplary embodiment of the present invention, methods and apparatus are provided for declaring and signaling representations and for enabling time synchronization and random seeking across multiple representations. In particular, a fragmented table that provides time mapping information relating media segments of one representation with corresponding media segments of other representations may be defined. When seeking or switching between representations, the client device can thus access the time mapping fragments to identify the appropriate media segment corresponding to the desired time point within the current representation or in the new representation, as described in greater detail below.

FIG. 1 illustrates a block diagram of a system 100 for streaming media files using an application layer transfer protocol, such as hypertext transfer protocol (HTTP), according to an example embodiment of the present invention. In an example embodiment, the system 100 comprises a client device 102 and a media content server 104. The client device 102 and the media content server 104 are configured to communicate over a network 108. The network 108, for example, comprises one or more wireline networks, one or more wireless networks, or some combination thereof. The network 108 may comprise a public land mobile network (PLMN) operated by a network operator. In this regard, the network 108, for example, comprises an operator network providing cellular network access, such as in accordance with 3GPP standards. The network 108 may additionally or alternatively comprise the Internet.

The client device 102 may comprise any device configured to access media files from a media content server 104 over the network 108. For example, the client device 102 may comprise a server, a desktop computer, a laptop computer, a mobile terminal, a mobile computer, a mobile phone, a mobile communication device, a game device, a digital camera/camcorder, an audio/video player, a television device, a radio receiver, a digital video recorder, a positioning device, any combination thereof, and/or the like.

Figure 2:
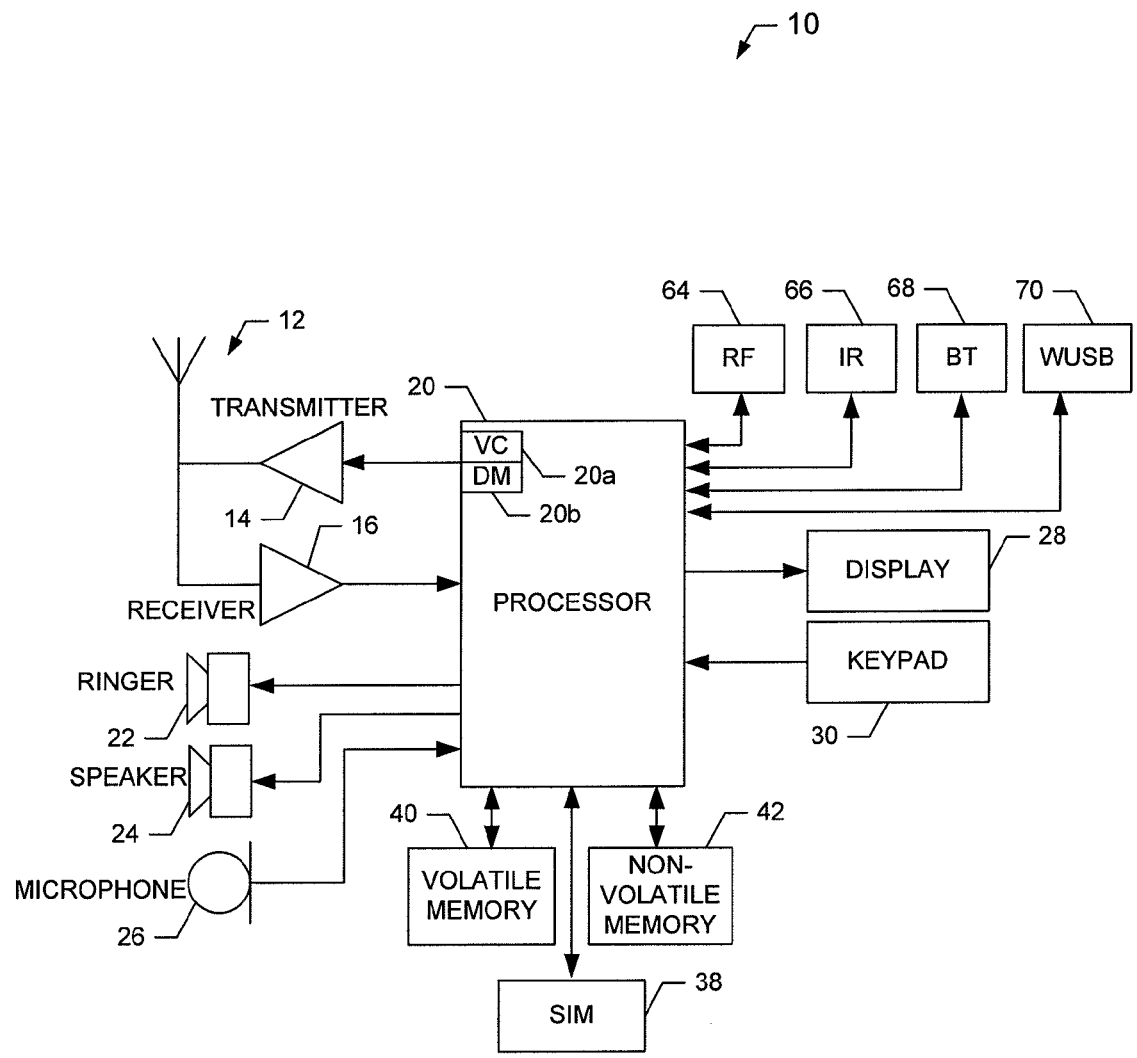
FIG. 2 is a schematic block diagram of a mobile terminal according to an exemplary embodiment of the present invention.

In an example embodiment, the client device 102 is embodied as a mobile terminal, such as that illustrated in FIG. 2. In this regard, FIG. 2 illustrates a block diagram of a mobile terminal 10 representative of one embodiment of a client device 102 in accordance with embodiments of the present invention. It should be understood, however, that the mobile terminal 10 illustrated and hereinafter described is merely illustrative of one type of client device 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a processor 20 that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or other processing circuitry. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40, non-volatile memory 42 may include a cache area for temporary storage of data. The memories may store one or more software programs, instructions, pieces of information, data, and/or the like, which may be used by the mobile terminal for performing functions of the mobile terminal. For example, the memories may comprise an identifier, such as an international mobile equipment identification (IMEI) code, capable of uniquely identifying the mobile terminal 10.

Referring again to FIG. 1, in an example embodiment, the client device 102 comprises various means, such as a processor 110, a memory 112, a communication interface 114, a user interface 116, and a media playback unit 118, for performing the various functions herein described. The various means of the client device 102 as described herein comprise, for example, hardware elements, e.g., a suitably programmed processor, combinational logic circuit, and/or the like, a computer program product comprising computer-readable program instructions, e.g., software and/or firmware, stored on a computer-readable medium, e.g. memory 112. The program instructions are executable by a processing device, e.g., the processor 110.

The processor 110 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an application specific integrated circuit (ASIC) or a field programmable gate array (FPGA), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the media client device 102 as described herein. In embodiments wherein the client device 102 is embodied as a mobile terminal 10, the processor 110 may be embodied as or otherwise comprise the processor 20. In an example embodiment, the processor 110 is configured to execute instructions stored in the memory 112 or otherwise accessible to the processor 110. The instructions, when executed by the processor 110, cause the client device 102 to perform one or more of the functionalities of the client device 102 as described herein. As such, whether configured by hardware or software operations, or by a combination thereof, the processor 110 may represent an entity capable of performing operations according to embodiments of the present invention when configured accordingly. For example, when the processor 110 is embodied as an ASIC, FPGA or the like, the processor 110 may comprise specifically configured hardware for conducting one or more operations described herein. Alternatively, as another example, when the processor 110 is embodied as an executor of instructions, the instructions may specifically configure the processor 110 to perform one or more operations described herein The memory 112 may include, for example, volatile and/or non-volatile memory. Although illustrated in FIG. 1 as a single memory, the memory 112 may comprise a plurality of memories. The memory 112 may comprise volatile memory, non-volatile memory, or some combination thereof. In this regard, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 112 may be configured to store information, data, applications, instructions, or the like for enabling the client device 102 to carry out various functions in accordance with embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. This stored information may be stored and/or used by the media playback unit 118 during the course of performing its functionalities.

The communication interface 114 may be embodied as any device or means embodied in hardware, a computer program product comprising computer readable program instructions stored on a computer readable medium (e.g., the memory 112) and executed by a processing device (e.g., the processor 110), or a combination thereof that is configured to receive and/or transmit data from/to a remote device over the network 108. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with other entities of the system 100. The communication interface 114 may be configured to receive and/or transmit data using any protocol that may be used for communications between computing devices of the system 100. The communication interface 114 may additionally be in communication with the memory 112, user interface 116, and/or media playback unit 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. The user interface 116 may provide an interface allowing a user to select a media file and/or a representation thereof to be streamed from the media content server 104 to the client device 102 for playback on the client device 102. In this regard, video from a media file may be displayed on a display of the user interface 116 and audio from a media file may be audibilized over a speaker of the user interface 116. The user interface 116 may be in communication with the memory 112, communication interface 114, and/or media playback unit 118, such as via a bus.

The media playback unit 118 may be embodied as various means, such as hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments where the media playback unit 118 is embodied separately from the processor 110, the media playback unit 118 may be in communication with the processor 110. The media playback unit 118 may further be in communication with the memory 112, communication interface 114, and/or user interface 116, such as via a bus.

The media content server 104 may comprise one or more computing devices configured to provide media files to a client device 102. In some embodiments, the media content server may include a streaming server, a content provider server, an Internet server, or any other network server or combination of servers. In an exemplary embodiment, the media content server 104 includes various means, such as a processor 120, memory 122, communication interface 124, user interface 126, and media streaming unit 128 for performing the various functions herein described. These means of the media content server 104 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g., memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 120 comprises a plurality of processors. The plurality of processors may be embodied on a single computing device or distributed across a plurality of computing devices. The plurality of processors may be in operative communication with each other and may be collectively configured to perform one or more functionalities of the media content server 104 as described herein. In an exemplary embodiment, the processor 120 is configured to execute instructions stored in the memory 122 or otherwise accessible to the processor 120. These instructions, when executed by the processor 120, may cause the network entity 104 to perform one or more of the functionalities of media content server 104 as described herein. As such, whether configured by hardware or software methods, or by a combination thereof, the processor 120 may represent an entity capable of performing operations according to embodiments of the present invention when configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, the instructions may specifically configure the processor 120 to perform one or more algorithms and operations described herein The memory 122 may include, for example, volatile and/or non-volatile memory. Although illustrated in FIG. 1 as a single memory, the memory 122 may comprise a plurality of memories, which may be embodied on a single computing device or distributed across a plurality of computing devices. The memory 122 may comprise volatile memory, non-volatile memory, or some combination thereof. In this regard, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the media content server 104 to carry out various functions in accordance with embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. This stored information may be stored and/or used by the media streaming unit 128 during the course of performing its functionalities.

The communication interface 124 may be embodied as any device or means embodied in hardware, a computer program product comprising computer readable program instructions stored on a computer readable medium, e.g., the memory 122, and executed by a processing device, e.g., the processor 120, or a combination thereof that is configured to receive and/or transmit data from/to a remote device over the network 108. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with other entities of the system 100. The communication interface 124 may be configured to receive and/or transmit data using any protocol that may be used for communications between computing devices of the system 100. The communication interface 124 may additionally be in communication with the memory 122, user interface 126, and/or media streaming unit 128, such as via a bus.

The user interface 126 may be in communication with the processor 120 to receive an indication of a user input and/or to provide an audible, visual, mechanical, or other output to the user. As such, the user interface 126 may include, for example, a keyboard, a mouse, a joystick, a display, a touch screen display, a microphone, a speaker, and/or other input/output mechanisms. In embodiments wherein the media content server 104 is embodied as one or more servers, the user interface 126 may be limited, or even eliminated. The user interface 126 may be in communication with the memory 122, communication interface 124, and/or media streaming unit 128, such as via a bus.

The media streaming unit 128 may be embodied as various means, such as hardware, a computer program product comprising computer readable program instructions stored on a computer readable medium, e.g., the memory 122, and executed by a processing device, e.g., the processor 120, or some combination thereof and, in one embodiment, is embodied as or otherwise controlled by the processor 120. In embodiments wherein the media streaming unit 128 is embodied separately from the processor 120, the media streaming unit 128 may be in communication with the processor 120. The media streaming unit 128 may further be in communication with the memory 122, communication interface 124, and/or user interface 126, such as via a bus.

In an example embodiment, the media playback unit 118 is configured to send a transfer protocol request for a media file to the media content server 104. In an example embodiment, the requested media file comprises a media file including metadata associated with the media data in the media file. In another example embodiment, the requested media file comprises a media file compliant with the ISOFF. Examples of an ISOFF comprise a 3GP media file and a moving picture experts group 4 (MPEG-4) Part 14 (MP4) file. The request, for example, may be sent in response to a user input or request received via the user interface 116.

In some embodiments, the metadata associated with a particular media file, for example, may be structured in accordance with the ISOFF as outlined in the table below:

TABLE 1

| 0 | 1 | 2 | 3 | 4 | 5 | Description |
|---|---|---|---|---|---|---|
| typ | | | | | | File type and compatibility |
| oov | | | | | | Container for all metadata |
| | | vhd | | | | Movie header, overall declarations |
| | | rak | | | | Container for an individual trak or stream |
| | | | | khd | | Track header, overall information in a track |

TABLE 1-continued

| 0 | 1 | 2 | 3 | 4 | 5 | Description |
|---|---|---|---|---|---|---|
|   |   | ref |   |   |   | Track reference container |
|   |   | dia |   |   |   | Container for media information in a track |
|   |   |   | dhd |   |   | Media header, overall information about the media |
|   |   |   | dlr |   |   | Handler, declares the media type |
|   |   |   | inf |   |   | Media information container |
|   |   |   |   | mhd |   | Video media header, overall information for video track only |
|   |   |   |   | mhd |   | Sound media header, overall information for sound track only |
|   |   |   |   | tbl |   | Sample table box, container for the time/space map |
|   |   |   |   |   | tsd | Sample descriptions for the initialization of the media decoder |
|   |   |   |   |   | tts | Decoding time-to-sample |
|   |   |   |   |   | tts | Composition time-to-sample |
|   |   |   |   |   | tsc | Sample-to-chunk |
|   |   |   |   |   | tsz | Sample sizes |
|   |   |   |   |   | tco | Chunk offset to beginning of the file |
|   |   |   |   |   | tss | sync sample table for Random Access Points |
| oof |   |   |   |   |   | Movie fragment |
|   | fhd |   |   |   |   | Movie fragment header |
|   | raf |   |   |   |   | Track fragment |
|   |   | fhd |   |   |   | Track fragment header |
|   |   | run |   |   |   | Track fragment run |
| fra |   |   |   |   |   | Movie fragment random access |
|   | fra |   |   |   |   | Track fragment random access |
|   | fro |   |   |   |   | Movie fragment random access offset |
| dat |   |   |   |   |   | Media data container |

In this regard, the media data may include a hierarchy of a plurality of levels of metadata. Each level may comprise one or more sublevels including more specific metadata related to the parent level. For example, a first level, "L0" in Table 1, comprises the metadata categories ftyp, moov, moof, mfra, and mdat. Ftyp and mdat may not include any sublevels. The second level, "L1" of moov, may comprise, for example, mvhd and trak. The third level, "L2" of trak, for example, comprises tkhd, tref, and mdia. The fourth level, "L3" of mdia, may, for example, comprise mdhd, hdlr, and minf. The fifth level, "L4" of minf, may comprise vmhd, smhd, and stbl. The sixth level, "L5" of stbl, may, for example, comprise stsd, stts, ctts, stsc, stsz, stco, and stss. Accordingly, the above table represents a nested hierarchy of blocks of metadata, wherein sublevels of a block of metadata are illustrated in rows below the row including the corresponding parent metadata block and in columns to the right of the column including the corresponding parent block of metadata. Thus, all sublevels of blocks of metadata of the moov block are shown in the rows of the table between the row including the moov block and the row including the "moof" block, e.g., another parent block of metadata, which is on the same level as the moov block. Similarly, all sublevels of blocks of metadata of the stbl block are shown in the rows of the table between the row including the stbl block and the row including the moof block, which is the first block at a level the same as or higher than the stbl block.

An HTTP streaming presentation consists of one or more representations. The use of representations allows the client device and its user to select the appropriate subset of the content according to the user's preferences and current connection characteristics. A representation is a subset of media tracks of the presentation content. A representation shall not contain tracks that constitute alternatives to each other as that would cause unnecessary redundancies.

A representation is independently accessible as a set of media segments. Each media segment is addressed via a unique Uniform Resource Locator (URL). A media segment may contain one or more movie fragments, where a movie fragment is a "moof" and "mdat" box pair, shown above in Table 1.

The media segments of a representation may be indexed using increment indices or time indices. In the former case, each media segment is assigned an integer index start from 1 for the first media segment and incrementing by one for each succeeding media segment. In the case of time indices, each media segment may be indexed with a time index that indicates a point of time that corresponds to the presentation time of media samples in the beginning of the media segment.

For each media segment of a specific representation, a set of information may be given, which may include presentation time boundaries. The presentation time boundaries, for example may allow the client device to be able to locate a specific playout time within a media segment. The offset of the movie fragment inside the media segment may also be given to enable more accurate access to the desired movie fragment, e.g., using byte ranges.

In some embodiments, media segments of a particular representation may have an approximately constant duration, of which the average duration is signaled to the client device by the media content server in the Multimedia Presentation Description (described below). Such a configuration would facilitate the switching between different representations as well as the seeking inside one representation as the client device would be able to locate the media segment that contains the media samples with the requested presentation time. Once inside the appropriate media segment, the client device would able to locate the exact media samples by inspecting the "mfra" box, shown in Table 1.

In other embodiments, the content preparation does not maintain approximately constant media segment durations. Thus, time mapping information can enable seeking and switching between representations in the case where the media segment duration is not constant or is relatively large.

Figure 3:
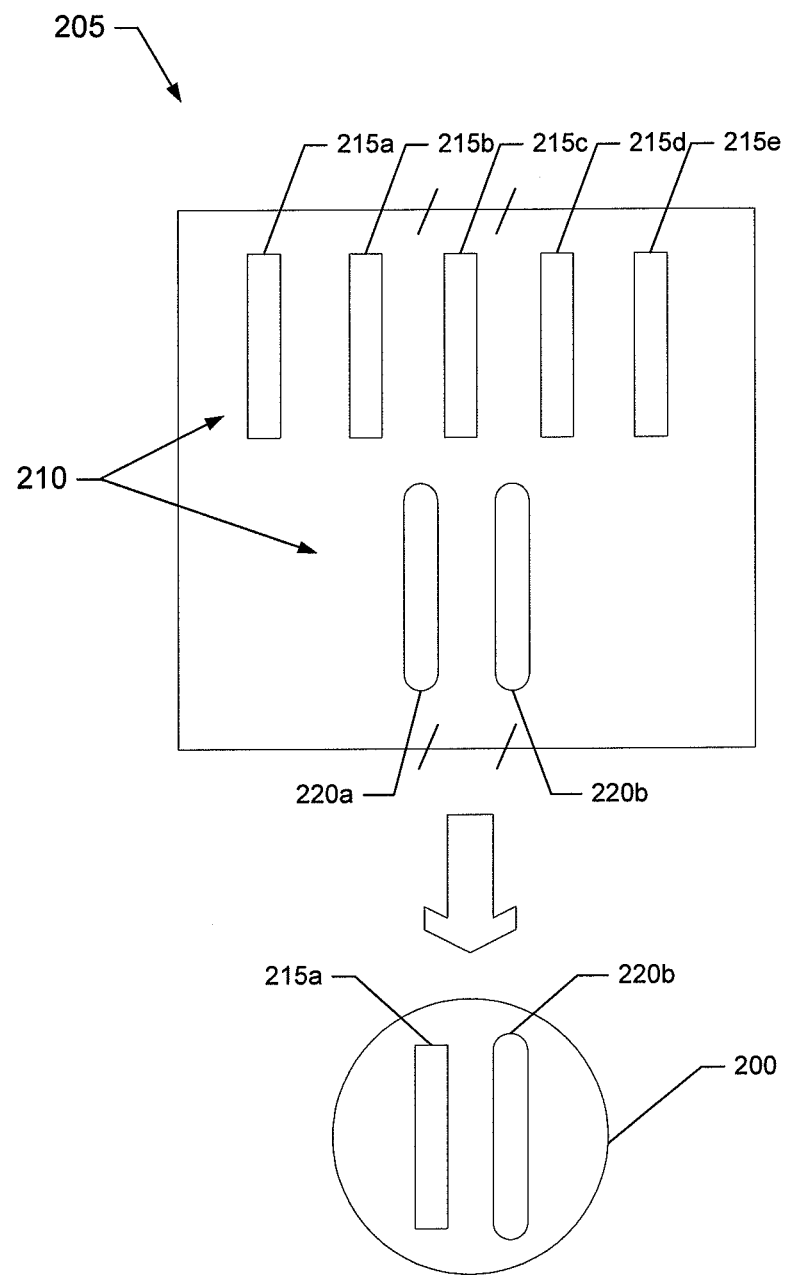
FIG. 3 illustrates a portion of a media content file including multiple media tracks and a representation of the content according to an exemplary embodiment of the present invention.

Keeping in mind the example of metadata shown in Table 1, and referring to FIG. 3, a representation 200 of media content may be defined as a subset of media tracks from a particular content file 205. In other words, a representation may be thought of as the smallest independently consumable portion of the content by the client, e.g., a portion that does not contain any tracks that constitute alternatives to each other. As an example, a content file 205 may contain 7 media tracks 210, including 5 video tracks 215 and 2 audio tracks 220. The video tracks 215 may be alternative encodings of the same video content (e.g., the same movie). The audio tracks 220 may likewise include the same content, such as different languages for the same movie). A representation 200 could then consist of one video track 215a and one audio track 220b. Other examples of a representation 200 may include a single audio track, a single video track, a single subtitle track, or a combination of audio, video, and/or subtitle tracks. Alternative tracks may include different resolutions of video (e.g., high definition or standard), different bitrates (defining the quality of the presentation), different languages of audio, different languages for subtitling, and so on.

As mentioned above, content that is meant for distribution via adaptive HTTP streaming is usually available in multiple representations. The representations allow adaptation of the content by the client device. For example, in the case of movie content, the client device may be able to select between presenting a movie in High Definition with an English soundtrack and presenting the same movie in standard definition in French. The client device typically selects the appropriate representation at the beginning of the playback, but may switch from one representation to another during the delivery and playback. In addition, the client device may seek a particular time point within the same representation.

A representation may include a representation description indicating which media tracks make up the representation. For example, each media track 210 may be assigned a media track ID that is used in the representation description. The media track IDs may also define the parameters that are used to build the URL or other address that is used to access the media segments of the particular representation 200. In addition, the representation description may include an indication of the characteristics of the representation 200, such as the resulting bandwidth and/or the audio languages and/or the subtitling languages. An example of a representation description element 250 provided in Extensible Markup Language (XML) format is shown in FIG. 4. In addition, each representation 200 may be identified by a unique representation identifier value. The representation identifier may be used in a URL to allow the client device to request media segments of a specific representation, as described below.

Thus, the representation description may allow the client device 102 to select the appropriate representations according to the user's preference. When the representation description is not present, the client will select a subset of the tracks that does not contain any alternative tracks (tracks that constitute alternatives to each other and are not meant to be consumed together). For example, as mentioned above, multiple audio tracks may be meant to provide alternatives for the client device to select only one of the tracks for playback. When representations are not suggested or provided by the media content server, the media content server may allow the client device to create an appropriate representation by selecting the media tracks of the representation.

Figure 5:
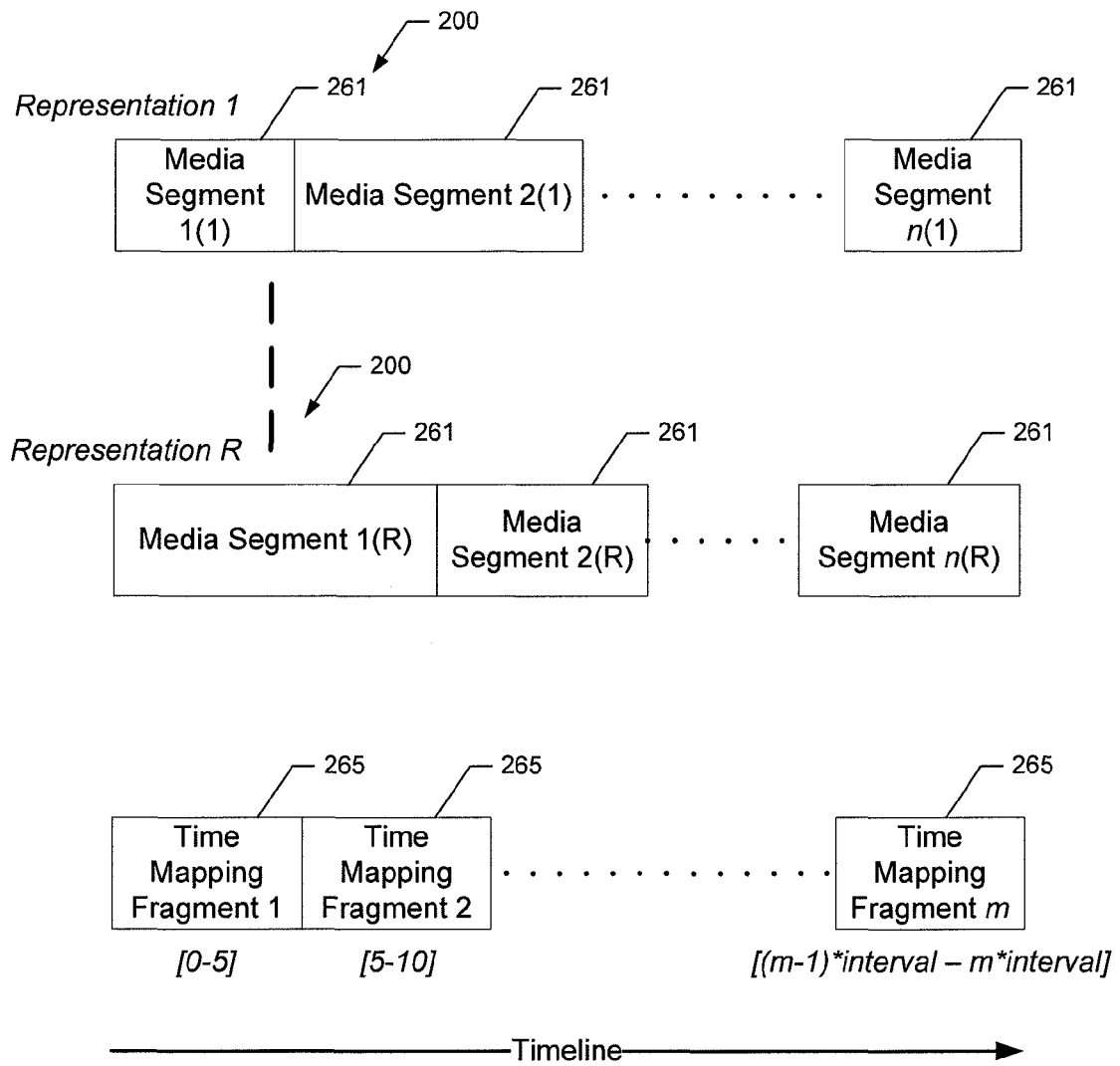
FIG. 5 illustrates a first representation and a second representation, each including media segments, and time mapping fragments including information mapping media segments from the first representation to media segments in the second representation.

Turning to FIG. 5, each representation 200 may be divided into media segments 261 that are progressively downloaded from the media content server 104 by the client device 102 and presented to the user. In this way, the client device does not have to wait for all of the media segments 261 for a given representation to be downloaded before starting the playback, which would increase the user's wait time for experiencing the media content. For example, a client device presenting a first representation (Representation 1 in FIG. 5) to the user may begin playback of Media Segment 1(1) while at the same time continue downloading Media Segments 2(1), 3(1), etc.

As mentioned above and illustrated schematically in FIG. 5, different media segments 261 within a particular representation 200 may not have the same time duration (i.e., one may be longer than another), and media segments also may not be time aligned between different representations. Thus, a user currently in Representation 1 at time point 6 seconds, for example, may be in Media Segment 2(1), whereas the same time point in Representation R may correspond to Segment 1(R). In this case, if the client device were to switch from Representation 1 to Representation R based on media segment indexing along, the client device may present content that is at a different time point along the timeline due to the fact that the wrong (i.e., non-corresponding) media segment would be accessed. This may result in missing content to the user or repeated content, depending on the duration of the current media segments of the current representation versus the duration of the media segments of the desired representation.

Thus, in addition to a description of the representation (e.g., the media track IDs, resulting bandwidth, and other characteristics of the representation), in some embodiments time mapping information may also be provided for each media segment 261. The time mapping information may relate the media segments of one representation with corresponding media segments of other representations based on a time point along the timeline. In other words, the time mapping information describes which media segment of Representation R, for example, corresponds to a given media segment at a particular time point. Stated differently, the time mapping information provides a map that shows the relationship between the time and the media segment index for each representation.

The time mapping information may be divided into time mapping fragments 265 such that the client device need not download all of the time mapping information at once, but may selectively access the time mapping information that is relevant to the particular representation and/or the particular time point desired. In some embodiments, the time mapping fragments include time mapping information pertaining to all of the representations of the given media content file, as illustrated in FIG. 5. In this case, when a decision to switch representations is made, the client device may request the relevant time mapping fragment based on the desired representation and the desired time point. The time mapping fragment may be created and preloaded on the media content server, or the media content server may create the appropriate fragment upon receiving the request from the client device.

Once the relevant time mapping fragment is retrieved, for example from the media content server or another location on the network accessible to the client device, the client device can identify the media segment in the desired representation at the desired time point and define a request to retrieve that particular media segment from the media content server. Thus, using the example shown in FIG. 5, in response to a decision to switch from Representation 1 to Representation R during playback of Media Segment 2(1) at time point 6, the client device would retrieve Time Mapping Fragment 2, identify the media segment of Representation R that corresponds to time point 6 (e.g., Media Segment 1(R)), and retrieve that identified media segment.

Figure 7:
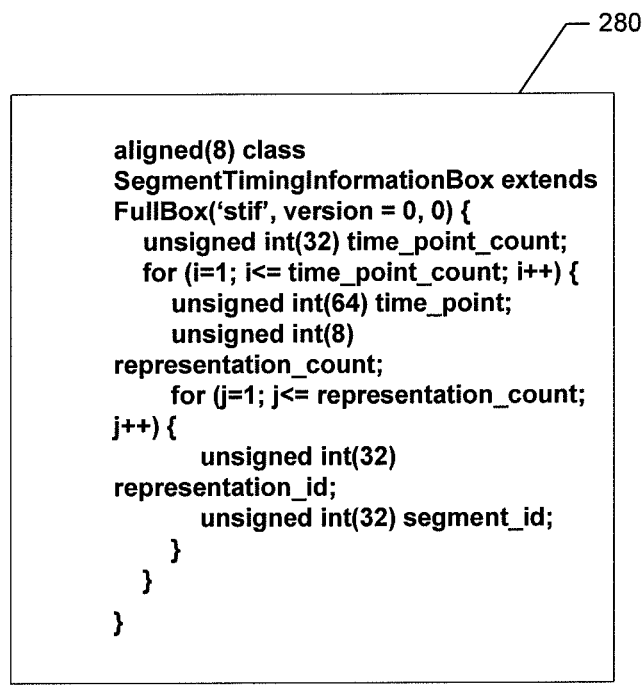
FIG. 7 depicts how the "stif" box may be defined according to an exemplary embodiment of the invention.

In other embodiments, at least one media segment may include the time mapping fragment that relates to that particular media segment, e.g., the time mapping information may be delivered as part of the media content itself. For example, as shown in Table 2, a new "box" may be introduced that carries the time mapping information. In Table 2, the box corresponding to time mapping information is labeled "stif" (Media Segment Timing Information). The "stif" box may be inserted at any position in the file, for example, before each Mth movie fragment, as shown in Table 2. FIG. 7 provides an example 280 of how the "stif" box may be defined. With reference to Table 2 and FIG. 7, the "time_point" may thus correspond to the media content of the following movie fragment. In this way, the client device would not need to retrieve the relevant time mapping fragment from the network location because the time mapping fragment would already be provided with the downloaded media segment. With reference to FIG. 5, for example, Media Segment 1(1) may include with it time mapping fragment 1 because the duration does not exceed the duration of time mapping fragment 1, whereas Media Segment 1(R) may include with it time mapping fragment 1 and time mapping fragment 2.

possible and valid URLs for accessing the different media segments and different time mapping fragments. The URL pattern includes of a set of parameters that the client device 102 is permitted to change by inserting the appropriate parameter values in the URL pattern.

The URL pattern may be provided to the client device by the media content server as part of a Multimedia Presentation Description. The Multimedia Presentation Description can be considered the entry point to consuming the media content for the client device and may contain information that describes the media content and how to access it. The Multimedia Presentation Description may carry a description of how to access the time mapping fragments as well as the duration of those time mapping fragments. A new parameter may be defined to index the time mapping fragments and may be used in the URL pattern to build the correct URL to access a desired time mapping fragment. The time mapping fragments may thus be accessed only on need basis.

Turning again to FIG. 5, each time mapping fragment 265 may cover a time interval T that is equal for all the time mapping fragments. The duration T may be indicated as a parameter of the time mapping information in the Multimedia

TABLE 2

| 0 | 1 | 2 | 3 | 4 | 5 | Description |
|---|---|---|---|---|---|---|
| typ | | | | | | File type and compatibility |
| oov | | | | | | Container for all metadata |
| | vhd | | | | | Movie header, overall declarations |
| | rak | | | | | Container for an individual trak or stream |
| | | khd | | | | Track header, overall information in a track |
| | | ref | | | | Track reference container |
| | | dia | | | | Container for media information in a track |
| | | | dhd | | | Media header, overall information about the media |
| | | | dlr | | | Handler, declares the media type |
| | | | inf | | | Media information container |
| | | | | mhd | | Video media header, overall information for video track only |
| | | | | mhd | | Sound media header, overall information for sound track only |
| | | | | tbl | | Sample table box, container for the time/space map |
| | | | | | tsd | Sample descriptions for the initialization of the media decoder |
| | | | | | tts | Decoding time-to-sample |
| | | | | | tts | Composition time-to-sample |
| | | | | | tsc | Sample-to-chunk |
| | | | | | tsz | Sample sizes |
| | | | | | tco | Chunk offset to beginning of the file |
| | | | | | tss | sync sample table for Random Access Points |
| tif | | | | | | Media Segment Timing Information |
| oof | | | | | | Movie fragment |
| | fhd | | | | | Movie fragment header |
| | raf | | | | | Track fragment |
| | | fhd | | | | Track fragment header |
| | | run | | | | Track fragment run |
| fra | | | | | | Movie fragment random access |
| | fra | | | | | Track fragment random access |
| | fro | | | | | Movie fragment random access offset |
| dat | | | | | | Media data container |

Furthermore, each time mapping fragment may include time mapping information pertaining to all of the representations of a given media file, or each time mapping fragment may only include time mapping information for a particular representation, in which case the request by the client device would access different time mapping fragments based on the desired representation and the desired time point.

The client device may be configured to access the relevant time mapping fragment by creating an appropriate URL. In this regard, a URL pattern may be provided by the media content server 104 to the client device 102 to describe the Presentation Description. An example of an XML element 270 that addresses the time mapping fragments 265 is shown in FIG. 6.

The URL pattern thus may provide the position of the time mapping fragments for each specific representation 201, 202 or media track. More specifically, the URL pattern may include a variable parameter that describes the way to access a specific time mapping fragment, for example by giving a URL prefix and an index of the time mapping fragment. In one embodiment, for example, the first time mapping fragment is indexed as 1 and corresponds to the time interval

[0—Interval]; the second time mapping fragment is indexed as "2" and corresponds to the time interval [Interval—2*Interval]; and so on. The time interval is signaled as a parameter in the URL pattern and may be provided as a unit of time, such as seconds. The value of the time interval may be signaled to the client device, for example in the Multimedia Presentation Description. The time interval thus indicates the granularity of the time index.

An example of a URL pattern pointing to a time mapping fragment may be http://www.company.com/streaming/content/RepresentationTimingParameter. The client device in this example may replace the term RepresentationTimingParameter with a multiple of the time interval value. For example, referring to FIG. 5, if the time interval is assigned a value of 5 seconds and the client device 102 is prompted to retrieve the time mapping fragment that contains information regarding the time point of 27 seconds, the client device would use the URL http://www.company/streaming/content/25, "25" being the immediately preceding multiple of the time interval 5. Thus, the client device would substitute the RepresentationTimingParameter with "25," and a URL would thus be created that describes the time interval [25-30] and accesses the relevant time mapping fragment. If a segment contains media samples that belong to two or more time intervals, the segment may be described in all corresponding time mapping fragments.

The syntax of a time mapping fragment may be given using XML or another language. For example, the time mapping fragment may contain the following parameters: (1) Start Time of the sub-interval; (2) Representation ID and Media Segment ID. In other words, each time point in this example would contain a list of (Representation ID, Media Segment ID) pairs. In this way, the client device would be able to determine where to find media samples that correspond to this time point in each of the given representations. For example, a user that is playing a first representation (Representation 1) and is currently playing a particular media segment (Media Segment 2(1)) within that representation may decide to switch to a second representation (Representation R). The client device may access the time mapping fragment 265 corresponding to the current media segment (Media Segment 2(1)) and use the Start Time information in a URL pattern to locate the corresponding time (and, as a result, the appropriate media segment) in the desired second representation (Representation R). An example XML schema that describes a time mapping fragment is shown in FIG. 10.

A similar approach would apply to seeking within a particular representation. In this case, the client device may access the time mapping fragment corresponding to the current media segment and use the Start Time information (which, in this case, would be the desired time point rather than the current time point) in the URL pattern to locate the corresponding media segment.

In cases where the media content is being streamed live (as opposed to "on demand"), a reserved media segment identifier, such as "Now," may be used to point to the media segment that contains the current media data. The media segment may be created by the media content server 104 or through the content preparation for each representation at the client device 102 and may be marked with "Cache-Control" in the header field containing a "max-age" parameter that does not exceed the duration of media segment data.

The client device may request the media segment "Now" periodically to get the current Live media segment. In order to avoid retrieving an outdated "Now" media segment, the client device may include an HTTP conditional request header, such as the HTTP header "If-Modified-Since." As a value of the "If-Modified-Since" header, the client device may give the "Date" value of the previous retrieved "Now" media segment.

In another example, after the first media segment request, which uses "Now" to tune in to a live stream, subsequent requests may start using normal media segment identifiers, such as numerical identifiers of the media segments that correspond to segment_id, as described above and in FIG. 7.

Figure 8:
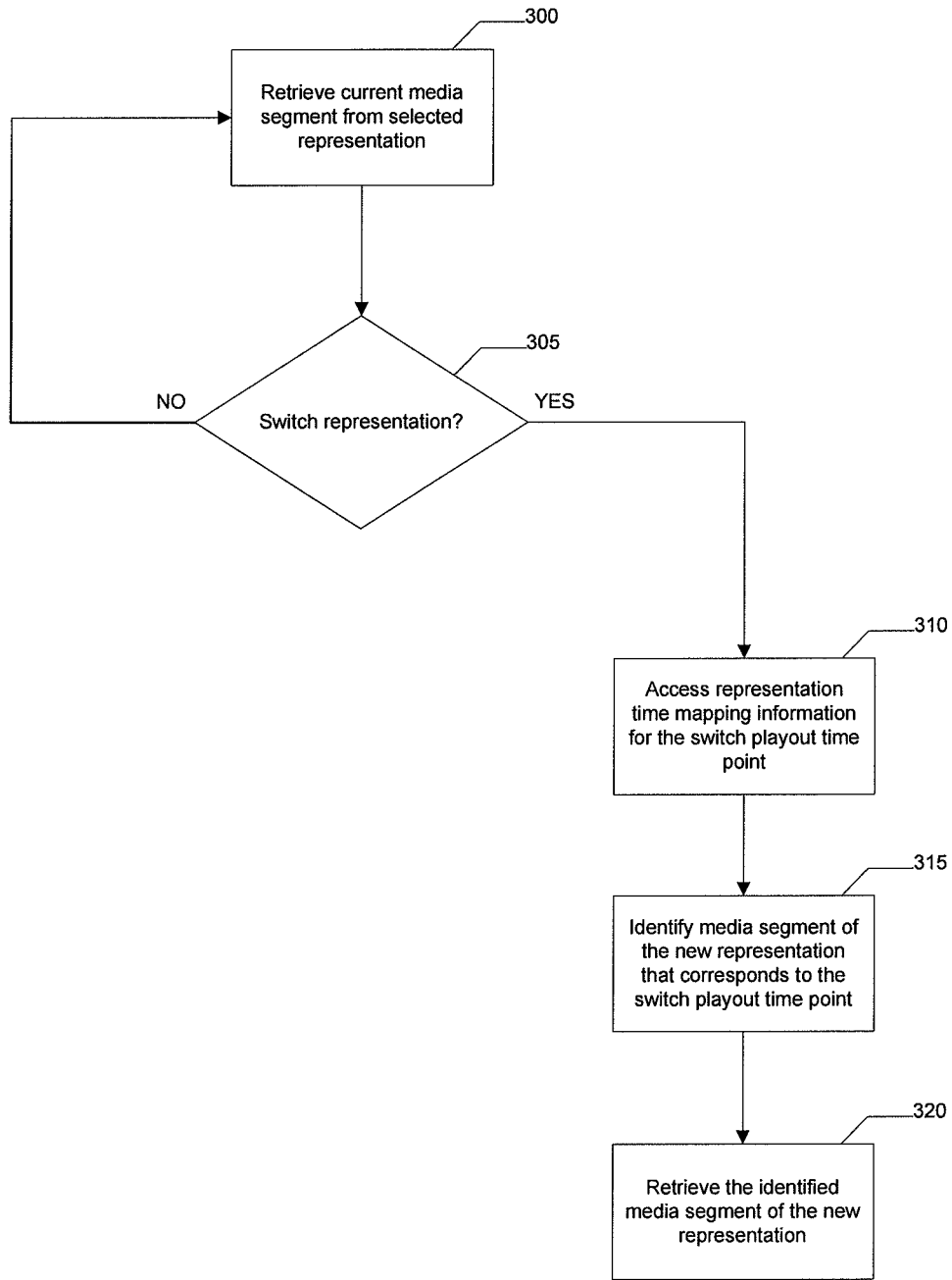
FIG. 8 illustrates a flowchart according to exemplary methods for accessing time mapping information and retrieving corresponding media segments across multiple representations according to exemplary embodiments of the invention.

FIG. 8 is a flowchart illustrating a method for accessing time mapping information and retrieving corresponding media segments across multiple representations, according to an exemplary embodiment of the invention. As noted above, the use of HTTP as a transport protocol in conjunction with FIG. 8 is provided by way of example and not of limitation, as other transfer protocols may be similarly employed. Regardless of the transfer protocol used, FIG. 8 illustrates operations that occur at a client device 102. At 300, a current media segment is retrieved from a selected representation. At that point the user may decide to switch representations, at 305. If the decision is made not to switch representations, the current media segment continues to be retrieved at 300. If, however, the decision is made to switch representations, the time mapping information for the switch playout time is accessed based on the current media segment at 310. A media segment of the new representation is then identified at 315 that corresponds to the switch playout time that was used at 310. Using the location information, the media segment id for the corresponding media segment in the new representation may be identified, and the media segment of the new representation may be retrieved at 320, thereby maintaining the time alignment of the old representation with the new representation.

Figure 9:
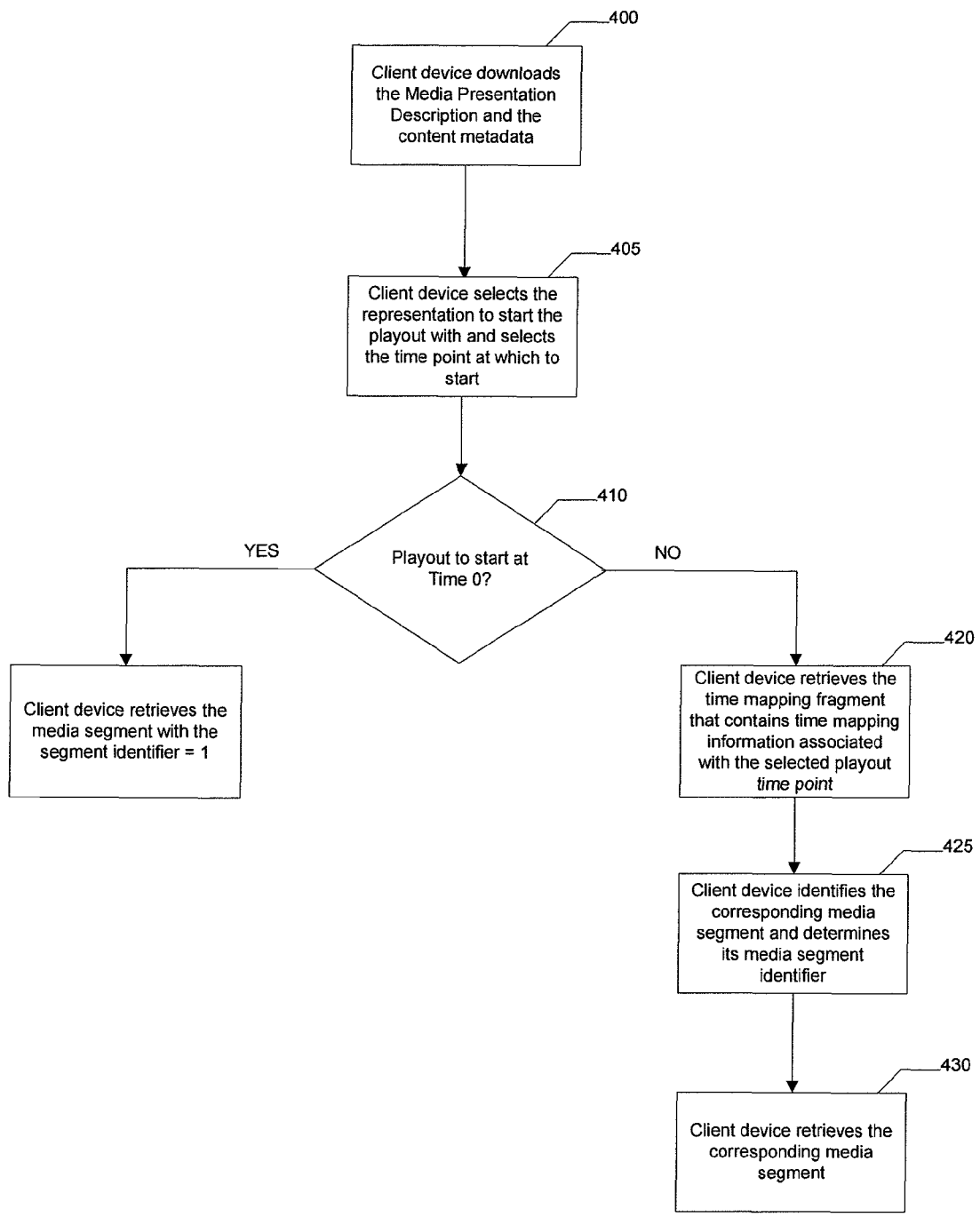
FIG. 9 illustrates a flowchart according to exemplary methods for accessing time mapping information and retrieving corresponding media segments within a particular representation according to exemplary embodiments of the invention.

FIG. 9 illustrates a method for accessing time mapping information and retrieving corresponding media segments within a particular representation according to exemplary embodiments of the invention. For example, the client may download the Media Presentation Description and the content metadata at 400. The client may then select a representation with which to start the playout and a time point at which to start (such as time 0, or the beginning of the content) at 405. If the playout is to start at time 0, the client device would retrieve the media segment having a media segment id of 1, which in this case corresponds to the selected time 0, at 410, 415. Alternatively, if the playout is to start at a time other than time 0, the client may retrieve the time mapping fragment for the given representation that contains time mapping information for the selected time point at 420. The client device of this embodiment would then locate the corresponding media segment based on the time mapping information and would determine the media segment id for the corresponding media segment in the current representation for the desired time point at 425. Finally, the client of this embodiment would retrieve the new media segment based on the media segment id at 430.

Notably, the time mapping information is not necessarily limited to mapping the relationship between times and media segment ids. In some embodiments, for example, the time may be mapped to a byte offset (i.e., an offset of the media segment in a particular file). In this case, the byte offset would serve to identify a particular media segment, thus allowing the client to locate and retrieve a particular media segment that corresponds to a particular time, as described above.

FIGS. 8 and 9 are flowcharts of a system, method, and computer program product according to exemplary embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, several advantages are provided to computing devices, computing device users, and network operators in accordance with embodiments of the invention. For example, adaptive streaming of media content may be provided, such as by using TCP over HTTP, while allowing the user to switch representations without disruption in the timing of the playback media segment. In this regard, streaming of media content may be facilitated for media content formatted in accordance with any media file format based upon the International Organization for Standardization (ISO) base media file format. A protocol for streaming of media content may also be provided, such as by using TCP over HTTP, that is interoperable with various network types, including, for example, local area networks, the Internet, wireless networks, wireline networks, cellular networks, and the like.

Network bandwidth consumption and processing requirements of computing devices receiving and playing back streaming media may also be reduced pursuant to embodiments of the invention. In this regard, network bandwidth may be more efficiently used by reducing the amount of metadata transmitted for a media file by selectively extracting and progressively delivering only that data required by the receiver for playback of the streaming media. A device playing back the streaming media in accordance with embodiments of the invention may also benefit by not having to receive and process as much data.

In one exemplary embodiment, a method and computer program product for receiving and presenting, or playing-out, representations of media content and for enabling time synchronization and random seeking across multiple representations are provided. According to the method and the computer program product, a client device presents a first media segment of a first representation of a selected media content file. The client device determines a desired time point or a desired second representation to be presented. A second media segment is identified and retrieved, wherein the second media segment contains one or more media samples with presentation time equal to the desired presentation time point in the first representation or in the desired second representation or equal to the current time point in the desired representation.

In some cases, the second media segment is identified by accessing time mapping information for the desired time point. Accessing the time mapping information may include requesting and retrieving at least one particular time mapping fragment relating to the first media segment or to the second media segment. Alternatively, accessing the time mapping information may include accessing a particular time mapping fragment that is included as part of the first media segment.

Determining a desired time point or a desired second representation to be presented may include receiving a user input indicating the desired time point or the desired second representation. Where the user input indicates a desired time point, the second media segment retrieved corresponds in time to the desired time point. Where the user input indicates a desired second representation, the second media segment retrieved corresponds in time to the first segment of the first representation.

In some embodiments, identifying the second media segment comprises identifying a segment identifier associated with the second media segment based on the time mapping information. Also, retrieving the second media segment of the second representation may include creating a Uniform Resource Locator (URL) including the segment identifier. Creating the URL may include modifying a URL pattern received from a media content server. In some cases, identifying the second segment comprises accessing a representation description associated with the second representation.

In another exemplary embodiment, a method and computer program product for declaring and signaling representations of media content and for enabling time synchronization and random seeking across multiple representations are provided. According to the method and the computer program product, an apparatus, such as a media content server, transmits a Multimedia Presentation Description to a client device in response to a request for media content. A first media segment of a first representation is transmitted to the client device, and time mapping information relating to at least one media segment is created. The time mapping information is transmitted by the apparatus to the client device. The time mapping information may be transmitted to the client device with the corresponding media segments or in response to at least one request made by the client device. The Multimedia Presentation Description may include a Uniform Resource Locator (URL) pattern that is used by the client device to retrieve or request the time mapping information.

In some cases, the time mapping information includes a plurality of time mapping fragments, wherein each time mapping fragment associates at least one media segment with a presentation time interval. A first time mapping fragment may be transmitted to the client device in response to a request for the first time mapping fragment, wherein the request is based on the URL pattern and the presentation time interval of the first media segment. Alternatively, the first time mapping fragment may be transmitted to the client device in connection with transmission of the first media segment. In some cases, the first time mapping fragment may be created and transmitted to the client device in response to a request from the client device. The second media segment may be transmitted to the client device based on a request from the client device, wherein the request includes content derived from the URL pattern and the first time mapping fragment.

In another exemplary embodiment, an apparatus is provided that includes a processor and a memory storing computer code instructions that when executed by the processor cause the apparatus to present a first segment of a first representation of a selected media content file. The memory and the computer code instructions, with the processor, further cause the apparatus to determine a desired time point or a desired second representation to be presented. The apparatus is caused to identify a second media segment, wherein the second media segment contains one or more media samples with presentation time equal to the desired presentation time point in the first representation or in the desired second representation or equal to the current time point in the desired representation. The memory and the computer code instructions, with the processor, further cause the apparatus to retrieve the second media segment.

In some cases, the apparatus is configured to identify the second media segment by accessing time mapping information for the first media segment or the first representation. The apparatus may be caused to transmit a request for retrieving a particular time mapping fragment, wherein the time mapping fragment associates at least one media segment with a presentation time interval. Alternatively, the apparatus may access a particular time mapping fragment that is included as part of the first media segment.

The apparatus may determine a desired time point or a desired second representation to be presented by receiving a user input indicating the desired time point or the desired second representation. Where the user input indicates a desired time point, the second media segment retrieved corresponds in time to the desired time point. Where the user input indicates a desired second representation, the second media segment retrieved corresponds in time to the first segment of the first representation.

In another exemplary embodiment, an apparatus is provided that includes a processor and a memory storing computer code instructions that when executed by the processor cause the apparatus to transmit a Multimedia Presentation Description to a client device in response to a request for media content. The memory and the computer code instructions, with the processor, further causes the apparatus to transmit a first media segment of a first representation to the client device and to create time mapping information relating to the at least one media segment. The apparatus is further caused to transmit the time mapping information to the client device. The time mapping information may be transmitted as time mapping fragments to the client device with the corresponding media segments or in response to at least one request made by the client device. The Multimedia Presentation Description may include a Uniform Resource Locator (URL) pattern that is used by the client device to retrieve or request the time mapping information.

In some cases, the apparatus may create a plurality of time mapping fragments, wherein each time mapping fragment associates at least one media segment with a presentation time interval. The apparatus may be caused to transmit a first time mapping fragment to the client device in response to a request for the first time mapping fragment, wherein the request is based on the URL pattern. Alternatively, the apparatus may be caused to transmit the first time mapping fragment to the client device in connection with transmission of the first media segment. In some cases, the apparatus may create the first time mapping fragment and to transmit the first time mapping fragment to the client device in response to a request from the client device. The apparatus may be caused to transmit the second media segment to the client device based on a request from the client device, wherein the request includes content derived from the URL pattern and the first time mapping fragment.

In another exemplary embodiment, a system is provided that includes a client device configured to present at least one media segment and a media content server configured to communicate time mapping information to the client device over a network. The client device may present a first media segment of a first representation of a selected media content file. The client device may then determine a desired time point or a desired second representation to be presented. The media content server may transmit time mapping information to the client device with the corresponding media segments or in response to at least one request made by the client device. The client device may then identify a second media segment based on the time mapping information and may request the second media segment from the media content server. The client device may request the time mapping information or the second media segment using a Uniform Resource Locator (URL) pattern that is transmitted by the media content server to the client device.

In some embodiments, media segment durations do not change across a single representation, and the necessary time values for media segments may be signaled inside the Multimedia Presentation Description. In other embodiments, the media segment durations are allowed to change within a representation, time mapping fragments are used, wherein the time mapping fragments may be stored separately from the Multimedia Presentation Description and accessed on need-basis. URL patterns may be used to address time mapping fragments.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A method comprising:
    causing presentation, by a client device, of a first media segment of a first representation of a selected media content file;
    determining at least one of a desired time point or a desired second representation of the selected media content file, wherein the desired time point is a point along a timeline of the media content file;
    identifying a second media segment associated with the determined at least one of the desired time point or the desired second representation; and
    retrieving, by the client device, the second media segment from a network server for presentation,
    wherein each of the first and second representations is independently accessible as a set of media segments,
    wherein the first representation includes at least the first media segment and the second media segment in an instance in which only the desired time point is determined, and
    wherein the first representation includes at least the first media segment and the second representation includes at least the second media segment in an instance in which the desired second representation is determined.

2. A method as claimed in claim 1, wherein said identifying comprises:
    accessing time mapping information mapping media segments to corresponding presentation time; and
    identifying the second media segment based at least in part on accessed time mapping information.

3. A method as claimed in claim 2, wherein said time mapping information comprises a fragmented table comprising one or more time mapping fragments and wherein accessing time mapping information comprises retrieving at least one particular time mapping fragment relating to at least one of the first media segment, the desired time point and the second media segment.

4. A method as claimed in claim 3, wherein said at least one particular time mapping fragment is included as part of the first media segment.

5. A method as claimed in claim 1, wherein said determining at least one of a desired time point and a desired second representation comprises at least one of:
    receiving user input indicating at least one of the desired time point and the desired second presentation;
    determining a desired time point in the first representation; and
    determining a desired time point in the desired second presentation.

6. A method as claimed in claim 1, wherein said identifying a second media segment comprises identifying a segment identifier associated with the second media segment and wherein retrieving the second media segment comprises creating a uniform resource locator based at least in part on the identified segment identifier.

7. A computer readable memory comprising computer executable program code, the computer executable program code when executed causes an apparatus to perform the method of claim 1.

8. A method comprising:
    causing transmission, by a network server, of a multimedia presentation description to a client device in response to a request for media content by said client device;
    causing transmission of a first media segment of a first representation of the media content to the client device;
    causing transmission of time mapping information to the client device, wherein the time mapping information maps at least one media segment of a respective representation of the media content to a corresponding presentation time; and
    causing transmission of a second media segment of a respective representation of the media content to the client device, wherein the second media segment corresponds to the mapped presentation time,
    wherein each representation is independently accessible as a set of media segments, and
    wherein the presentation time comprises a point along a timeline of the media content.

9. A method as claimed in claim 8, wherein transmitting time mapping information comprises at least one of:
    causing transmission of the time mapping information in response to a request by the client device; and
    causing transmission of the time mapping information in connection with transmission of the first media segment.

10. A method as claimed in claim 8, wherein said time mapping information comprises a plurality of time mapping fragments, and each time mapping fragment associates at least one media segment with a presentation time interval.

11. A computer readable memory comprising computer executable program code, wherein the computer executable program code when executed causes an apparatus to perform the method of claim 8.

12. An apparatus, comprising:
    at least one processor, and
    at least one memory including computer executable program code, the at least one memory and the computer executable program code working with the at least one processor to cause the apparatus to perform at least the following:
    cause presentation of a first media segment of a first representation of a selected media content file;
    determine at least one of a desired time point or a desired second representation of the selected media content file, wherein the desired time point is a point along a timeline of the media content file;
    identify a second media segment associated with the determined at least one of the desired time point or the desired second representation; and
    retrieve the second media segment from a network server for presentation
    wherein each of the first and second representations is independently accessible as a set of media segments,
    wherein the first representation includes at least the first media segment and the second media segment in an instance in which only the desired time point is determined, and
    wherein the first representation includes at least the first media segment and the second representation includes at least the second media segment in an instance in which the desired second representation is determined.

13. An apparatus as claimed in claim 12, wherein in identifying the second media segment the apparatus is caused to:
    access time mapping information, mapping media segments to corresponding presentation time; and
    identify the second media segment based at least in part on accessed time mapping information.

14. An apparatus as claimed in claim 13, wherein said time mapping information comprises one or more time mapping fragments and wherein in accessing time mapping information the apparatus is caused to retrieve at least one particular time mapping fragment relating to at least one of the first media segment, the desired time point and the second media segment.

15. An apparatus method as claimed in claim 14, wherein said at least one particular time mapping fragment being retrieved in connection with retrieving the first media segment.

16. An apparatus as claimed in claim 12, wherein in determining the at least one of the desired time point and the desired second representation the apparatus is caused perform at least one of:
   receive user input indicating at least one of the desired time point and the desired second presentation;
   determine a desired time point in the first representation; and
   determine a desired time point in the desired second presentation.

17. An apparatus as claimed in claim 12, wherein in identifying the second media segment the apparatus is caused to identify a segment identifier associated with the second media segment and wherein in retrieving the second media segment the apparatus is caused to create a uniform resource locator based at least in part on the identified segment identifier.

18. An apparatus comprising:
   at least one processor, and
   at least one memory including computer executable program code, the at least one memory and the computer executable program working with the at least one processor to cause the apparatus to perform at least the following:
   cause transmission of a multimedia presentation description to a client device in response to a request for media content by said client device;
   cause transmission of a first media segment of a first representation of the media content to the client device;
   cause transmission of time mapping information to the client device, wherein the time mapping information maps at least one media segment of a respective representation of the media content to a corresponding presentation time; and
   cause transmission of a second media segment of a respective representation of the media content to the client device, wherein the second media segment corresponds to the mapped presentation time,
   wherein each representation is independently accessible as a set of media segments, and
   wherein the presentation time comprises a point along a timeline of the media content.

19. An apparatus as claimed in claim 18, wherein in transmitting time mapping information the apparatus is caused to perform at least one of:
   cause transmission of the time mapping information in response to a request by the client device; and
   cause transmission of the time mapping information in connection with transmission of the first media segment.

20. An apparatus as claimed in claim 18, wherein said time mapping information comprises a plurality of time mapping fragments, and each time mapping fragment associates at least one media segment with a presentation time interval.

* * * * *